(12) United States Patent
Johnsen et al.

(10) Patent No.: US 11,897,597 B2
(45) Date of Patent: Feb. 13, 2024

(54) FLAP PRESSURE SHAPE BIASING

(71) Applicant: The Boeing Company, Chicago, IL (US)

(72) Inventors: Kevin Mark Johnsen, Seattle, WA (US); Ryan L. Pettit, Snohomish, WA (US); Heidi M. Haugeberg, Snohomish, WA (US); Ryley Thies Ohlsen, Sultan, WA (US)

(73) Assignee: The Boeing Company, Arlington, VA (US)

( * ) Notice: Subject to any disclaimer, the term of this patent is extended or adjusted under 35 U.S.C. 154(b) by 210 days.

(21) Appl. No.: 17/374,669

(22) Filed: Jul. 13, 2021

(65) Prior Publication Data
US 2022/0017209 A1    Jan. 20, 2022

Related U.S. Application Data

(60) Provisional application No. 63/054,074, filed on Jul. 20, 2020.

(51) Int. Cl.
| | |
|---|---|
| *G05D 1/00* | (2006.01) |
| *B64C 13/16* | (2006.01) |
| *G05D 1/08* | (2006.01) |
| *B64C 21/08* | (2023.01) |

(52) U.S. Cl.
CPC .............. *B64C 13/16* (2013.01); *B64C 21/08* (2013.01); *G05D 1/0816* (2013.01)

(58) Field of Classification Search
CPC ... B64C 13/16; B64C 21/08; B64C 2009/143; B64C 3/58; G05D 1/0816; G05D 1/00; Y02T 50/40

USPC ............................................................ 701/3
See application file for complete search history.

(56) References Cited

U.S. PATENT DOCUMENTS

| | | | |
|---|---|---|---|
| 4,796,192 A | 1/1989 | Lewis | |
| 7,483,773 B1 * | 1/2009 | Tripp | G08G 5/006 340/961 |
| 9,267,491 B2 * | 2/2016 | Vossler | F03D 7/022 |
| 9,789,955 B1 * | 10/2017 | Isotani | B64C 9/02 |
| 2009/0065636 A1 * | 3/2009 | Mathieu | B64C 13/16 701/3 |
| 2009/0222151 A1 * | 9/2009 | Averseng | G05D 1/0066 701/8 |
| 2012/0001028 A1 * | 1/2012 | Frey | B64C 9/16 244/208 |
| 2016/0031546 A1 * | 2/2016 | Rolston | B64C 3/58 244/213 |
| 2017/0190413 A1 * | 7/2017 | Hansen | B64C 13/341 |
| 2017/0259908 A1 * | 9/2017 | Omeara | B64C 9/04 |
| 2018/0356439 A1 * | 12/2018 | Luo | G01P 21/025 |
| 2019/0359314 A1 * | 11/2019 | Tsai | B64C 9/18 |

(Continued)

*Primary Examiner* — Shardul D Patel
(74) *Attorney, Agent, or Firm* — HANLEY, FLIGHT & ZIMMERMAN, LLC

(57) ABSTRACT

Flap pressure shape biasing is disclosed. A disclosed example apparatus includes a flight monitor to determine a movement parameter of an aircraft, the movement parameter corresponding to at least one of a Mach number of the aircraft, an airspeed of the aircraft, or a vertical acceleration of the aircraft, and a spoiler controller to adjust a position of a spoiler of the aircraft to reduce pressure on a flap based on the movement parameter by moving a pressure transition away from the flap.

22 Claims, 8 Drawing Sheets

(56) References Cited

U.S. PATENT DOCUMENTS

2020/0055585 A1\* 2/2020 Hung ...................... B64U 30/10
2020/0255124 A1\* 8/2020 Tessier ...................... B64C 9/00

\* cited by examiner

FLAP PRESSURE SHAPE BIASING

RELATED APPLICATION

This patent claims the benefit of U.S. Provisional Patent Application No. 63/054,074, which was filed on Jul. 20, 2020. U.S. Patent Application Ser. No. 63/054,074 is hereby incorporated herein by reference in its entirety. Priority to U.S. Patent Application Ser. No. 63/054,074 is hereby claimed.

FIELD OF THE DISCLOSURE

This disclosure relates generally to aircraft, and, more particularly, to flap pressure shape biasing.

BACKGROUND

During flight maneuvers that result in elevated Mach and/or vertical acceleration of an aircraft, control surfaces (e.g., flaps) of aerodynamic structures (e.g., wings, stabilizers, etc.) may experience significantly higher loads relative to other parts of a flight envelope, thereby necessitating structural reinforcements and/or larger and heavier components. The additional weight can result in a reduced fuel efficiency and/or diminished ability to efficiently maneuver the aircraft.

SUMMARY

An example apparatus for pressure shape biasing of an aircraft includes a flight monitor to determine a movement parameter of the aircraft, the movement parameter corresponding to at least one of a Mach number of the aircraft, an airspeed of the aircraft, or a vertical acceleration of the aircraft, and a spoiler controller to adjust a position of a spoiler of the aircraft to reduce pressure on a flap based on the movement parameter by moving a pressure transition away from the flap.

An example method to bias a pressure shape corresponding to an aircraft includes determining, by executing instructions with at least one processor, a movement parameter, the movement parameter corresponding to at least one of a Mach number of the aircraft, an airspeed of the aircraft, or a vertical acceleration of the aircraft. The example method also includes determining, by executing instructions with at the least one processor, an adjustment of a position of a spoiler of the aircraft based on the movement parameter to move a pressure transition away from a flap.

An example non-transitory computer readable medium including computer executable instructions that, when executed, cause one or more processing units to at least determine a movement parameter, the movement parameter corresponding to at least one of a Mach number of an aircraft, an airspeed of the aircraft, or a vertical acceleration of the aircraft, and determine, based on the movement parameter, an adjustment of a position of a spoiler of the aircraft to move a pressure transition away from a flap.

Figure 1:
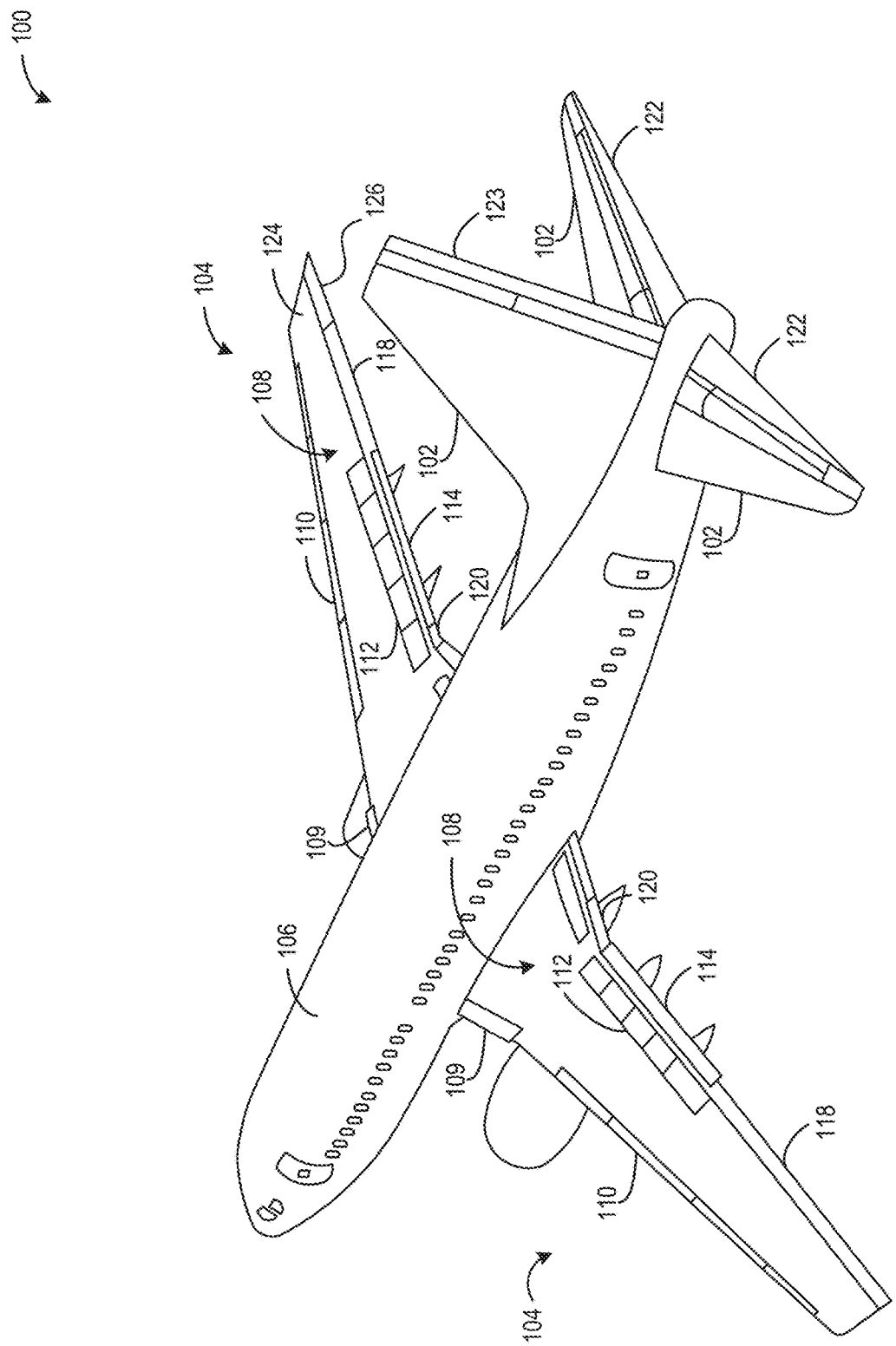
FIG. 1 illustrates an example aircraft in which examples disclosed herein may be implemented.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part is in any way on (e.g., positioned on, located on, disposed on, or formed on, etc.) another part, indicates that the referenced part is either in contact with the other part, or that the referenced part is above the other part with one or more intermediate part(s) located therebetween. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" with another part means that there is no intermediate part between the two parts.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Flap pressure shape biasing is disclosed herein. During flight maneuvers, control surfaces (e.g., flaps, spoilers, ailerons, elevators, rudders, etc.) of an aircraft may work to provide the appropriate flight dynamics to maneuver the aircraft and/or control speed of the aircraft. For example, while maneuvering at relatively high speeds (e.g., Mach numbers above cruise Mach), trailing edge devices and/or structures such as flaps on a wing of an aircraft, for example, may encounter significant loads. These loads may necessitate significant structural reinforcements of the flaps and/or additional strengthening components, thereby requiring additional weight that may reduce overall fuel efficiency of the aircraft.

Examples disclosed herein can employ pressure shape biasing to reduce loads encountered by trailing edge devices (e.g., flaps, rudders, ailerons, flaperons, etc.) of an aircraft. Some examples disclosed herein move and/or deflect a spoiler and, in turn, move, bias and/or shift pressure transition regions that can impart loads onto the trailing edge devices and, thus, reduce overall encountered loads. In particular, examples disclosed herein determine and/or measure a movement parameter of an aircraft, such as a Mach number, an airspeed, and/or a vertical acceleration and, accordingly, determine an adjustment of the position of a spoiler (e.g., a rotation of the spoiler) to reduce loads encountered by the control surfaces. Further, examples disclosed herein can reduce the need to implement structural reinforcements. Accordingly, examples disclosed herein enable the trailing edge devices to maneuver the aircraft more effectively as a result of a reduced weight of the aircraft and/or improved integration of components/devices associated with the trailing edge devices.

In some examples, an adjustment (e.g., a rotational adjustment) of the spoiler is calculated and/or determined to reduce the load of the control surfaces (e.g., flaps). Specifically, an orientation of the spoiler can be calculated and/or determined to reduce the load of a flap when the flap encounters relatively high loads (e.g., critical loads). In some examples, the load of the flap is compared to a threshold (e.g., a load threshold) to determine the adjustment of the position of the spoiler. In some examples, at least two of a pressure corresponding to the Mach number of the aircraft, a pressure corresponding to the airspeed of the aircraft, and a pressure corresponding to a vertical acceleration of the aircraft are compared and/or used in combination to determine a maximum load acting on the flap. In some such examples, the maximum load may be based on the airspeed of the aircraft at relatively lower altitudes. Additionally or alternatively, the maximum load may be based on the Mach number of the aircraft at relatively higher altitudes. Further, in some examples, flap pressure shape biasing is adjusted based on measured and/or determined positions of control surfaces of the aircraft in conjunction with the movement parameter.

In some examples, a flight monitor monitors and/or determines the movement parameter of the aircraft and a sensor(s) includes at least one sensor to determine the position (e.g., rotation) of at least one control surface of the aircraft. In some examples, the at least one sensor measures an orientation of the spoiler. In some such examples, a spoiler controller can adjust the position of the spoiler to reduce (e.g., minimize) pressure on the flap based on the movement parameter. Additionally, the spoiler controller may adjust the position of the spoiler based on the positions of multiple control surfaces. In some examples, a database (e.g., a flap pressure database) may be implemented to correlate the movement parameter to the load of the flap. In some examples, the flap pressure database includes flap pressure data related and/or corresponding to different orientations of control surfaces of the aircraft. Additionally, in some examples, the flap pressure database is generated based on wind tunnel testing data, flight test load surveys, and/or computational fluid dynamics analysis. Alternatively, in some examples, a load calculator calculates loads on the flap based on the movement parameter and/or the positions of control surfaces of the aircraft during flight.

As used herein, the term "control surface" refers to a component, geometry, and/or a surface that defines an aerodynamic flow surface used to control flight and/or navigation of an aircraft or other vehicle based on fluid flow (e.g., airflow during movement and/or flight). For example, the term "control surface" may encompass a surface of an aerodynamic structure (e.g., a top surface of a flap) or an actively displaced and/or rotated component such as a flap, spoiler, or aileron, etc. for example. As used herein the term "angle from horizontal" of an aircraft refers to an angle and/or relative angles corresponding to a reference plane defined as an angle away from a neutral position of a control surface, whereas the term "horizontal" in this context refers to the neutral and/or faired position and/or angle of the control surface. As used herein, the term "pressure shape biasing" refer to biasing or shifting a pressure transition region (e.g., a low to high pressure transition region) to reduce corresponding loads from acting on a component. Accordingly, the term "pressure shape biasing" can refer to adjusting a spoiler to an angle from horizontal that reduces pressure on a control surface, such as a flap. Further, as used herein, the terms "pressure transition" and "shockwave" can refer to a region of high pressure that results from a transition between low pressure to high pressure in a medium (e.g., air).

FIG. 1 illustrates an example aircraft 100 that may be used to implement examples disclosed herein. In the illustrated example, the aircraft 100 includes stabilizers 102 and wings 104 attached to a fuselage 106. The wings 104 of the illustrated example have control surfaces (e.g., flaps, ailerons, tabs, etc.) 108, some of which are located at a trailing edge of the wings 104 and may be displaced or adjusted (e.g., angled, deflected, etc.) to provide lift during takeoff, landing, and/or flight maneuvers. In some examples, the control surfaces 108 are operated (i.e., displaced) independently of one another. The control surfaces 108 include leading edge flaps 109, leading edge slats 110, spoilers (e.g., flight spoilers, ground spoilers, upper surface spoilers, etc.) 112, and a trailing edge flap (e.g., a rotatable flap) 114. The control surfaces 108 of the illustrated example also include ailerons 118 and flaperons 120. In this example, the stabilizers 102 include elevators 122 and a rudder 123. The wings 104 also define upper and lower surfaces thereof (e.g., upper and lower sides, upper and lower aerodynamic surfaces, etc.) 124, 126, respectively.

To maneuver the aircraft 100, the spoilers 112 of the illustrated example alter the lift and drag of the aircraft 100. The flaps 114 alter the lift and pitch of the aircraft 100. The flaperons 120, the spoilers 112, and the ailerons 118 of the illustrated example alter the roll of the aircraft 100. In this example, the slats 110 alter the lift of the aircraft 100. The control surfaces 108 of the illustrated example also play a role in controlling the speed of the aircraft 100. For example, the spoiler 112 may be used for braking of the aircraft 100. Any of the control surfaces 108 of the illustrated example may be independently moved (e.g., deflected) to direct movement of the aircraft 100.

Examples described herein may be applied to control surfaces associated with any of the stabilizers 102, the wings 104 and/or any other exterior or outboard structure (e.g., a horizontal stabilizer, a wing strut, an engine strut, a canard stabilizer, etc.) of the aircraft 100. Additionally or alternatively, in some examples, the fuselage 106 has control surfaces, which may be deflected, to alter the flight maneuvering characteristics during cruise and/or takeoff of the aircraft 100.

Figure 2A:
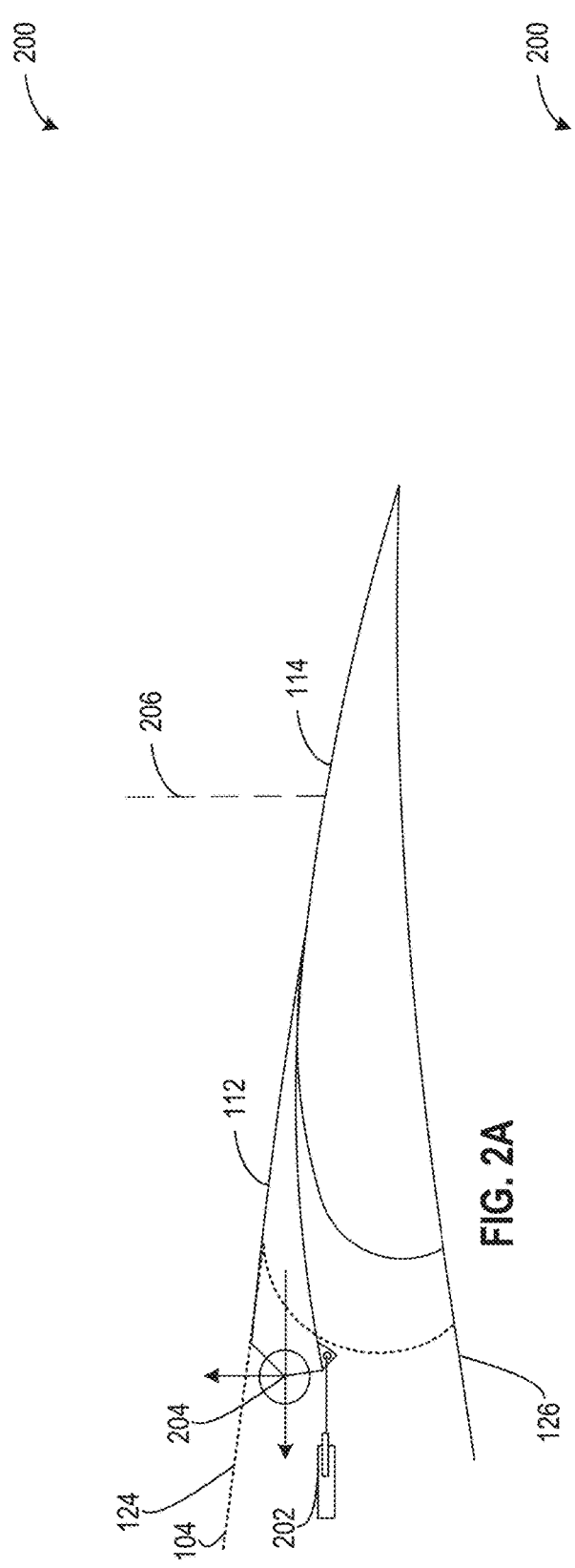
FIGS. 2A and 2B illustrate different angular orientations of a spoiler of the example aircraft of FIG. 1.
Figure 2B:
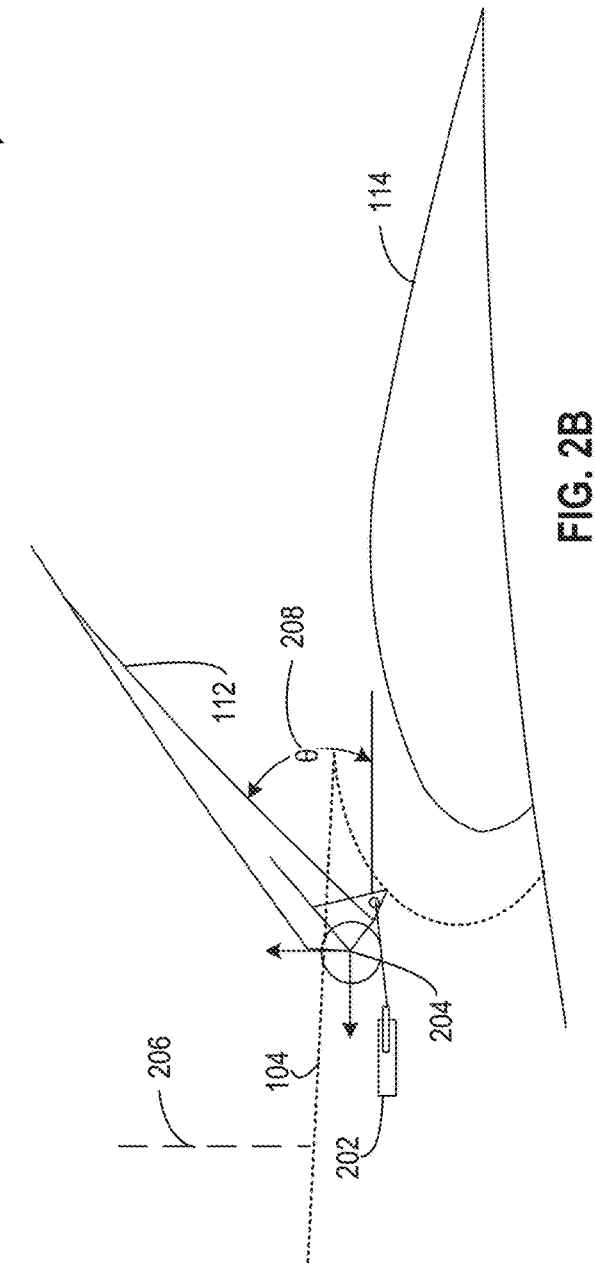

FIGS. 2A and 2B illustrate different angular orientations of the example spoiler 112 of the example aircraft 100 of FIG. 1. Turning to FIG. 2A, an example wing surface structure 200 of the example aircraft 100 is depicted with the spoiler 112 oriented at a first angular orientation. As shown in the illustrated example of FIG. 2A, the example wing surface structure 200 includes the wing 104, the spoiler 112, the flap 114, the upper surface of the wing 124, and the lower surface of the wing 126. The example wing surface structure 200 further includes a spoiler actuator 202, and a pivot (e.g., a coupling pivot, a bell crank, a rotating joint, a pivoting crank, etc.) 204. In the illustrated example of FIG. 2A, a pressure transition (e.g., a pressure transition region, a pressure transition edge, a high pressure region, a shockwave, etc.) 206 is depicted.

In the illustrated example, the aforementioned pressure transition 206 corresponds to a region in which relatively high pressure air transitions to relatively low pressure in a relatively abrupt manner. The pressure transition 206 is positioned proximate the flap 114, thereby causing significant loads of the flap 114. As a result, the significant loads encountered by the flap 114 can necessitate strengthening measures as well as reduce the overall effectiveness of the flap 114. Particularly, the pressure transition 206 can reduce the ability of the flap 114 to displace/angle and/or maneuver the aircraft 100.

Turning to FIG. 2B, a second angular orientation of the spoiler 112 of the example wing surface structure 200 is shown. The example of FIG. 2B illustrates an angle from horizontal 208 to which the spoiler 112 is moved (e.g., rotated, angled, actuated, etc.) to reduce (e.g., minimize) pressure acting on the flap 114. In the illustrated example, to deflect the spoiler 112 and reduce the load of the flap 114, the spoiler actuator 202 drives the rotation of the spoiler 112 about the pivot 204 to the angle from horizontal 208. In this example, the depicted angle from horizontal 208 of the spoiler 112 is approximately 10 degrees. In some examples, the angle from horizontal 208 may be in a range from 0 degrees to 15 degrees. However, any appropriate angular deflection range can be implemented instead.

In the illustrated example, the deflection of the spoiler 112 moves, biases, and/or shifts the pressure transition 206 away from the flap 114 and toward a fore portion of the wing 104, in contrast to the example orientation shown in FIG. 2A. Particularly, the deflection of the spoiler 112 can disrupt high pressure airflow closer to the fore portion of the wing 104 and, as a result, can move and/or displace the pressure transition 206 closer to a leading edge of the wing. As a result, the deflection of the spoiler 112 reduces the load of the flap 114 and, thus, can facilitate movement of the flap 114 to displace/angle and/or maneuver the aircraft 100 more effectively.

While the example of FIGS. 2A-2B is shown in the context of a spoiler being moved to alleviate and/or reduce a load of a flap, examples disclosed herein can be applied to any set of control surfaces. In particular, examples disclosed herein can be implemented with a first control surface that is deflected to pressure shift bias a load away from a second control surface (e.g., a second control surface downstream of the first control surface).

Figure 3:
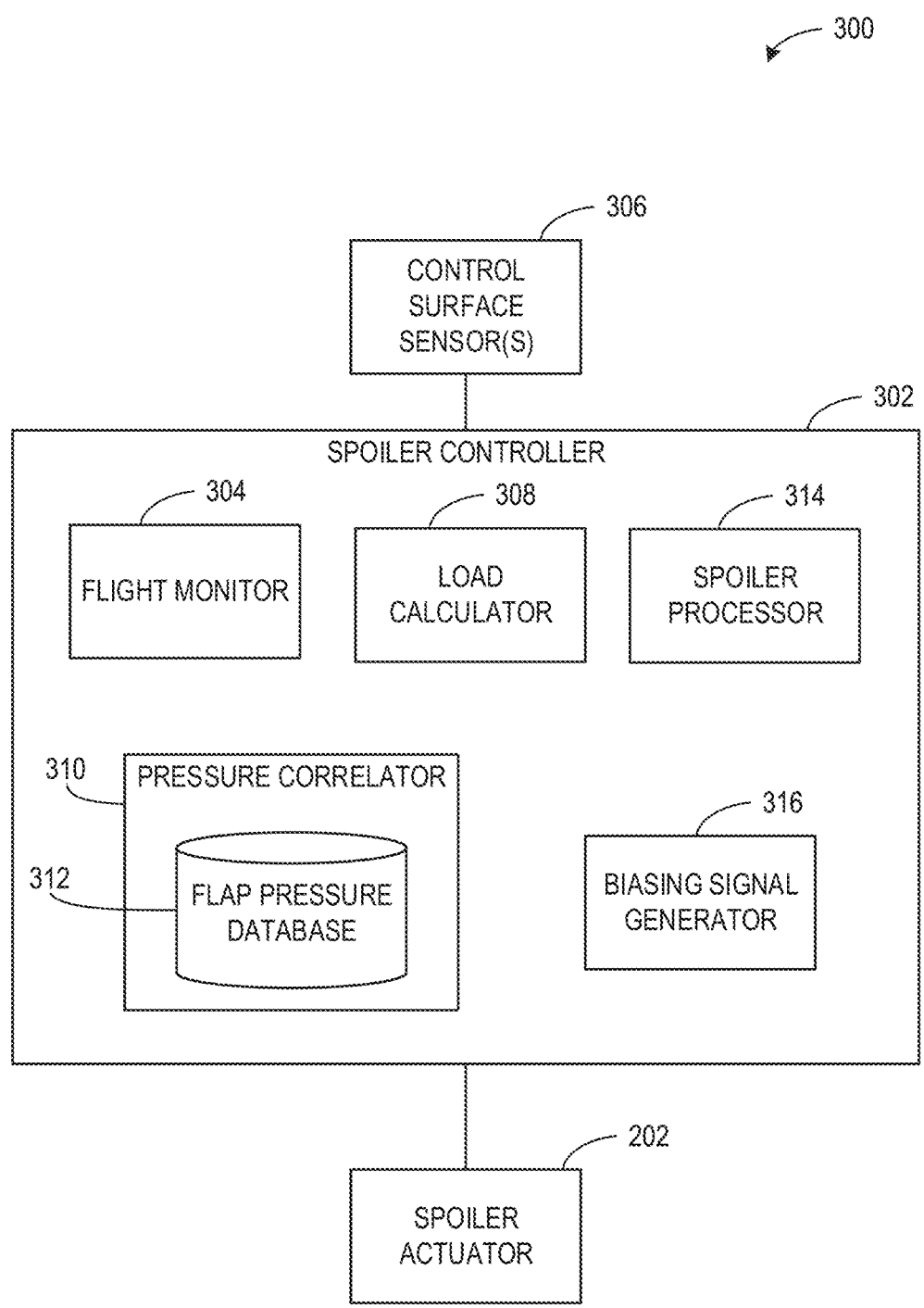
FIG. 3 is a block diagram representative of an example flap pressure shape biasing control system in accordance with teachings of this disclosure.

FIG. 3 is a block diagram representative of an example flap pressure shape biasing control system 300 in accordance with teachings of this disclosure. In the illustrated example, the flap pressure shape biasing control system 300 includes a spoiler controller 302, a sensor(s) (e.g., a control surface sensor, a motion sensor, an attitude sensor, etc.) 306, and the spoiler actuator 202 that is operatively coupled to the spoiler controller 302. In turn, the example spoiler controller 302 includes a flight monitor 304, a load calculator 308, a pressure correlator 310, a flap pressure database 312, a spoiler processor 314, and a biasing signal generator 316.

As illustrated in the example of FIG. 3, the sensor(s) 306 is operatively and/or communicatively coupled to the spoiler controller 302. In some examples, the sensor(s) 306 includes at least one sensor (e.g., position sensors, inertial measurement sensors, etc.) to measure positions of the control surfaces 108 of the aircraft 100 and/or an approximate orientation of the aircraft 100. In some examples, the sensor(s) 306 includes a plurality of positional sensors operatively coupled to respective ones of the control surfaces 108 to measure angular orientations of the associated control surfaces 108.

In the illustrated example, the flight monitor 304 determines and/or calculates movement parameters (e.g., a Mach number, an airspeed and/or a vertical acceleration) of the aircraft 100. In some examples, the flight monitor 304 is communicatively coupled to a sensor (e.g., a velocity sensor, an accelerometer) that determines the airspeed and/or a vertical acceleration of the aircraft 100. Additionally or alternatively, the flight monitor 304 may calculate a speed of sound at a position during flight and, thus, the Mach number of the aircraft 100. In some examples, to determine the Mach number of the aircraft 100, the flight monitor 304 receives data from an altitude meter and a thermometer to determine the speed of sound during flight of the aircraft 100. In some examples, the determined airspeed, Mach number, and/or vertical acceleration of the aircraft 100 are forwarded to the pressure correlator 310.

In some examples, the pressure correlator 310 determines and/or calculates the load of the flap 114 based on the movement parameter of the aircraft 100. In some examples, the pressure correlator 310 queries the flap pressure database 312, which can include flap load data (e.g., flap pressure data), to calculate the load of the flap 114. In some examples, the flap pressure database 312 correlates the movement parameter and different orientations of at least one of the control surfaces 108 of the aircraft 100 to the flap load data to determine the load of the flap 114. In some examples, the flap load data is generated based on test data (e.g., wind tunnel testing, flight testing, etc.) and/or computational data (e.g., computational fluid dynamics, etc.). In this example, the flap pressure database 312 relates a Mach number, an airspeed, and/or a vertical acceleration of the aircraft 100 to the load of the flap 114.

In some examples, the pressure correlator 310 queries the flap pressure database 312 to determine the load of the flap 114 at a first movement parameter corresponding to the Mach number, at a second movement parameter corresponding to the airspeed, and at a third movement parameter corresponding to the vertical acceleration. In some examples, the pressure correlator 310 compares the load of the flap 114 at the first movement parameter, the load of the flap 114 at the second movement parameter, and/or the load of the flap 114 at the third movement parameter to determine a maximum load of the flap 114 (e.g., a worst-case scenario load of the flap 114). Additionally or alternatively, in some examples, the load calculator 308 calculates a load of the flap 114 based on the first movement parameter, the second movement parameter, and/or the third movement parameter. Additionally or alternatively, the load is calculated based on the positions of the control surfaces 108. In some examples, the pressure correlator 310, or the load calculator 308, provides the maximum load of the flap 114 to the spoiler processor 314.

The example spoiler processor 314 determines and/or calculates an appropriate positional adjustment (e.g., a rotational and/or translational adjustment) of the spoiler 112 based on the maximum load of the flap 114. In some examples, the spoiler processor 314 compares the maximum load of the flap 114 to a load threshold to determine the positional adjustment of the spoiler 112. In some examples, the spoiler processor 314 controls the adjustment of the angular orientation of the spoiler 112 to be 10 degrees from horizontal when the maximum load of the flap 114 is greater than or equal to the load threshold. In other examples, the spoiler processor 314 compares the maximum load of the flap 114 to a plurality of load thresholds to determine a degree of the rotational adjustment of the position of the spoiler 112. In some such examples, each one of the load thresholds is associated with a corresponding angular rotation of the spoiler 112. For example, a first load threshold may be associated with a 3 degree rotational adjustment from horizontal of the spoiler 112, while a second load threshold may be associated with a 15 degree rotational adjustment from horizontal.

In the illustrated example, the spoiler processor 314 provides the determined adjustment of the orientation of the spoiler 112 to the biasing signal generator 316 to direct movement of the spoiler actuator 202 and, thus, the spoiler 112. Specifically, in some examples, the adjustment to the position of the spoiler 112 includes rotating the spoiler 112 to the angle from horizontal 208 within a range between 0 degrees and 15 degrees. However, any appropriate angular range can be implemented instead.

Figure 4:
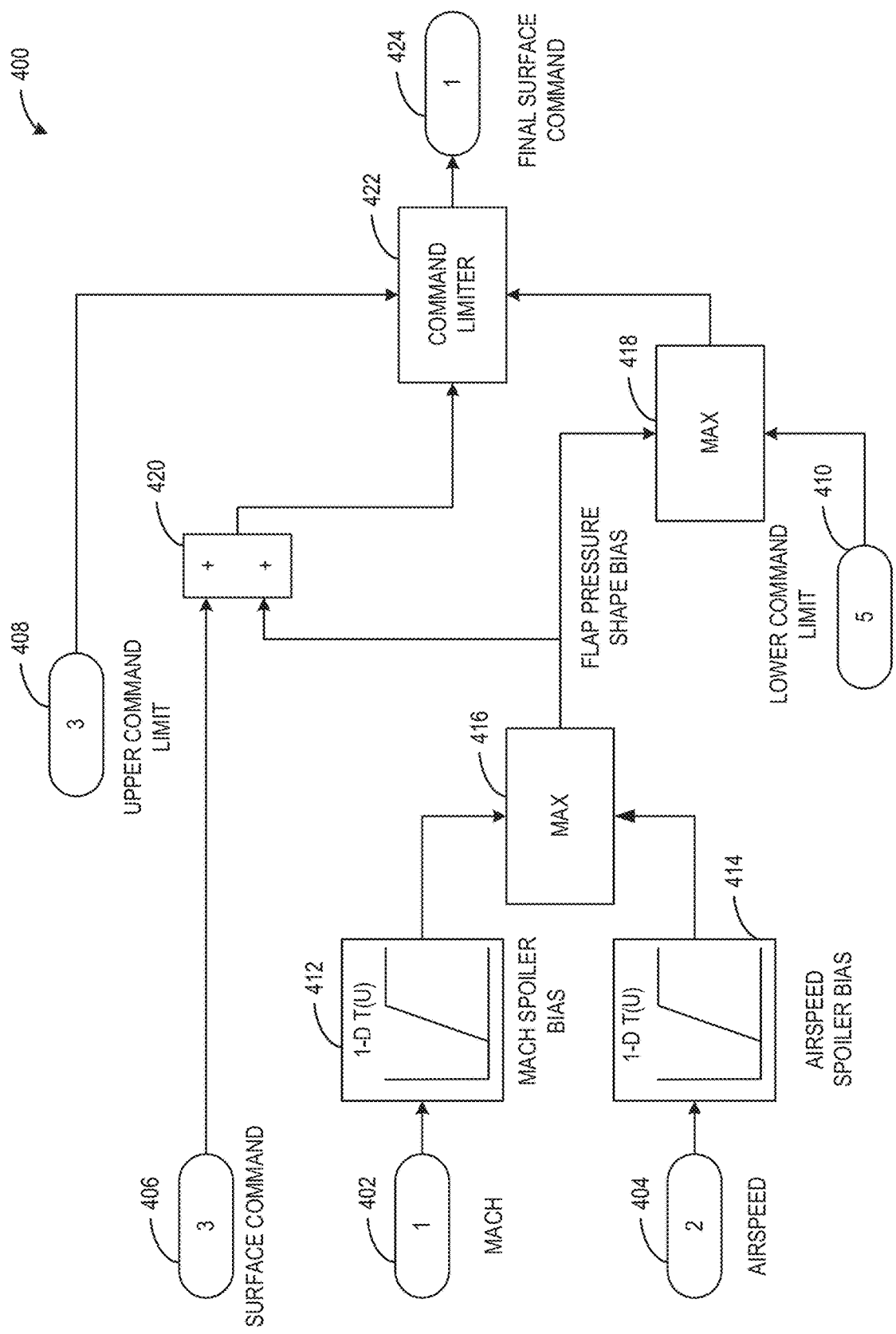
FIGS. 4-6 depict example control algorithms that can be implemented in examples disclosed herein.
Figure 5:
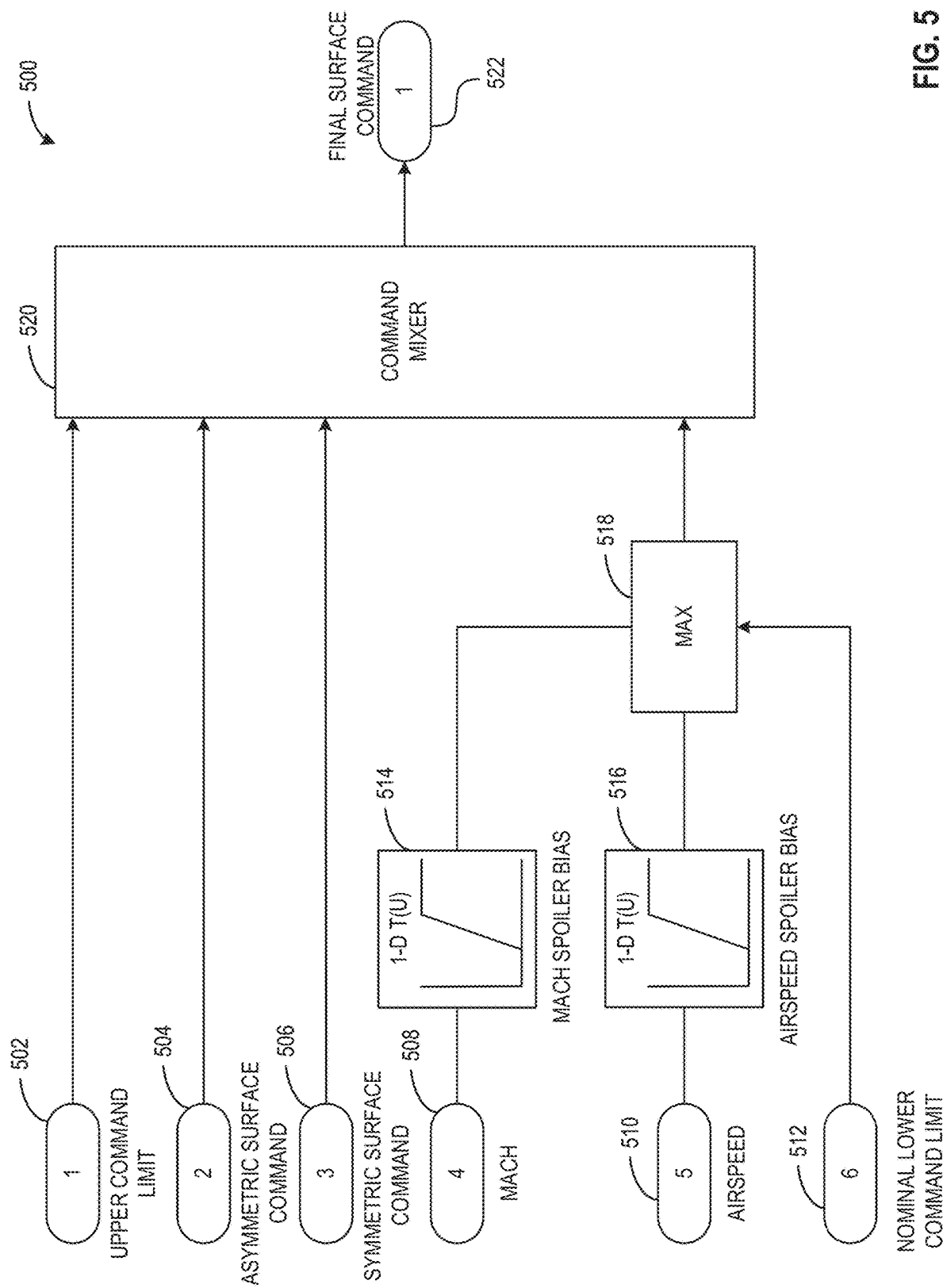
Figure 6:
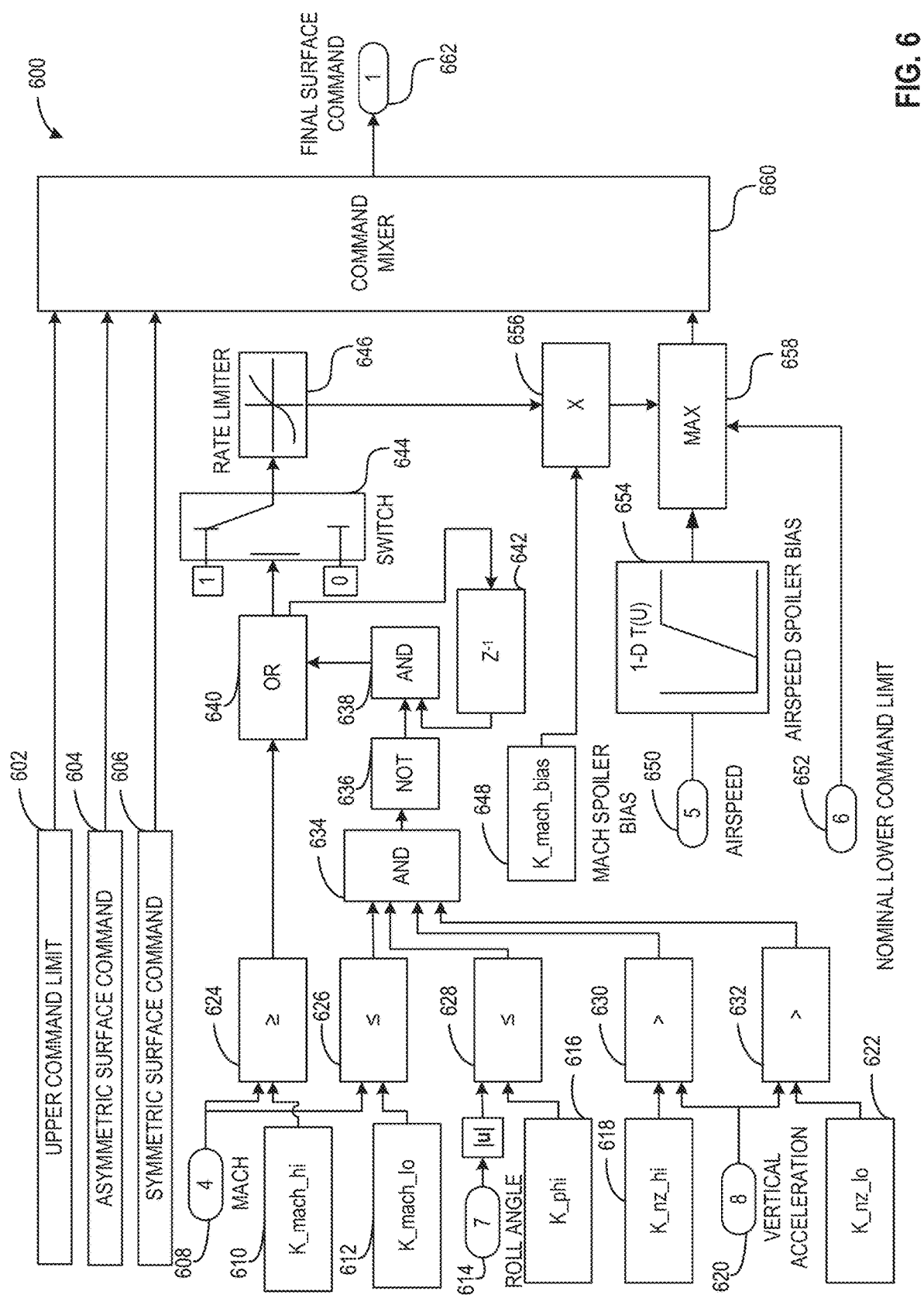

FIGS. 4-6 depict example control algorithms that can be implemented in examples disclosed herein. Turning to FIG. 4, an example schematic of an example control algorithm 400 is shown. In the illustrated example of FIG. 4, a Mach number 402, an airspeed 404, a surface command 406, an upper command limit 408, and a lower command limit 410 are provided as inputs to be subsequently processed by a command limiter 422, which can be implemented in the spoiler processor 314 shown in FIG. 3, to generate a final surface command 424 that directs rotational movement of the spoiler 112.

In some examples, the Mach number 402 and the airspeed 404 are provided to a Mach spoiler bias function 412 and an airspeed spoiler bias function 414, respectively. The example Mach spoiler bias function 412 and the airspeed spoiler bias function 414 calculate spoiler bias signals based on the Mach number 402 and the airspeed 404, respectively. In turn, the Mach spoiler bias function 412 and airspeed spoiler bias function 414 provide the spoiler bias signals to a first maximum determiner 416, denoted as "MAX." Further, the example first maximum determiner 416 compares the aforementioned spoiler bias signals and determines a flap pressure shape bias signal that is provided to a surface command function 420.

The surface command function 420 of the illustrated example determines a rotational adjustment (e.g., a summed rotational adjustment, an additive rotational adjustment, etc.) of the spoiler 112 based on the surface command 406 and the aforementioned flap pressure shape bias signal. Further, the surface command function 420 generates an adjusted flap pressure shape bias signal regarding the determined adjustment of the spoiler 112 orientation and provides the adjusted flap pressure shape bias signal to the command limiter 422.

Additionally or alternatively, the aforementioned flap pressure shape bias signal from the maximum determiner 416 is provided to a second maximum determiner 418, denoted by "MAX." In some such examples, the second maximum determiner 418 compares the flap pressure shape bias signal to the lower command limit 410 and provides a minimum deflection limit of the orientation of the spoiler 112 to the command limiter 422.

The command limiter 422 of the illustrated example calculates the final surface command 424 based on the adjusted flap pressure shape bias signal received from the surface command function 420, the minimum deflection limit of the orientation of the spoiler 112 from the second maximum determiner 418, and the upper command limit 408. In some examples, the adjusted flap pressure shape bias signal is compared to the upper command limit 408 and the minimum deflection limit prior to adjustment of the orientation of the spoiler 112 via the final surface command 424.

FIG. 5 is another example control algorithm 500 to implement examples disclosed herein. In the illustrated example of FIG. 5, an upper command limit 502, an asymmetric surface command 504, a symmetric surface command 506, a Mach number 508, an airspeed 510, and a nominal lower command limit 512 are provided as inputs to a command mixer 520, which can be implemented in the spoiler processor 314 shown in FIG. 3. In the illustrated example, the Mach number 508 and the airspeed 510 are provided to a Mach spoiler bias function 514 and an airspeed spoiler bias function 516, respectively. In turn, the Mach spoiler bias function 514 and the airspeed spoiler bias function 516 calculate spoiler bias signals associated with the orientation of the spoiler 112. The Mach spoiler bias function 514 and the airspeed spoiler bias function 516 then forward the spoiler biasing signals to a maximum determiner 518, denoted by "MAX."

In this example, the maximum determiner 518 compares the spoiler biasing signals and the nominal lower command limit 512 to determine a maximum thereof which, in turn, defines and/or is equivalent to a flap pressure shape bias signal. In some such examples, the maximum determiner 518 provides the flap pressure shape bias signal to the command mixer 520. Further, the command mixer 520 determines the adjustment of the spoiler 112 orientation based on the flap pressure shape bias signal in conjunction with the upper command limit 502, the asymmetric surface command 504, and the symmetric surface command 506. Subsequently, the command mixer 520 determines a final surface command 522 to adjust the orientation of the spoiler 112.

FIG. 6 is yet another example control algorithm 600 to implement the example flap pressure shape biasing control system 300 of FIG. 3. The example control algorithm 600 controls a rate of adjustment of the orientation of the spoiler 112. Additionally, the example control algorithm 600 takes into account Mach measurements degrading in accuracy during maneuvers and/or at higher speeds during flight of the aircraft 100. In some examples, the control algorithm 600 determines when the Mach measurements are relatively accurate and can be used to determine an adjustment of the orientation of the spoiler 112.

In the illustrated example, an upper command limit 602, an asymmetric surface command 604, and a symmetric surface command 606 are provided as inputs to a command mixer 660, which can be implemented in the spoiler processor 314 shown in FIG. 3. Additionally, a Mach number 608, a roll angle 614, a vertical acceleration 620, an airspeed 650, and a nominal lower command limit 652 are provided as inputs for the example control algorithm 600.

In some examples, the Mach number 608, the roll angle 614, and the vertical acceleration 620 are associated with one or more thresholds 610, 612 and/or limits 616, 618, 622. For example, the Mach number 608 is associated with the activation threshold 610, denoted as "K_mach_hi," and the deactivation threshold 612, denoted as "K_mach_lo." Additionally, the roll angle 614 is associated with a roll angle limit 616, denoted as "K_phi," and the vertical acceleration is associated with the vertical acceleration upper limit 618, denoted as "K_nz_hi," and the vertical acceleration lower limit 622, denoted as "K_nz_lo."

In some examples, threshold comparators 624, 626, 628, 630, 632 compare the Mach number 608, the roll angle 614, and the vertical acceleration 620 to the respective thresholds/limits 610, 612, 616, 618, 622. In some examples, the threshold comparators 626, 628, 630, 632 indicate whether the Mach number 608, the roll angle 614, and/or the vertical acceleration 620 satisfy the conditions of the thresholds/limits 612, 616, 618, 622 to a first AND logic gate 634. In this example, the first AND logic gate 634, a NOT logic gate 636, a second AND logic gate 638, and an OR logic gate 640 are implemented as a logical network to direct an input into a switch 644.

In some examples, when the spoiler 112 orientation is to be adjusted, the second AND gate 638 activates (e.g., turns on) the logical OR gate 640 to communicate the spoiler 112 orientation adjustment. Additionally, the threshold comparator 624 indicates if the Mach number 608 is greater than the activation threshold 610 to the OR gate 640. In this example, if the threshold comparator 624 or the second AND gate 638 indicate the adjustment of the spoiler 112 orientation, the OR gate 640 causes the switch 644 to turn on. In some examples, the OR gate includes a second output signal to a past value function 642, denoted as "$Z^{-1}$," in communication with the second AND gate 638. In some examples, the past value function 642 communicates the second output signal to the second AND gate 638 with a delay. In some examples, the second AND gate 638 implements the adjustment of the spoiler 112 orientation when the past value function 642 indicates that the threshold comparator 624 has been satisfied and the NOT logic gate 636 indicates that the conditions of the first AND gate 634 are not satisfied. In some examples, the first AND gate 634 is satisfied when the aircraft 100 slows down and, thus, Mach measurements are more reliable.

In some examples, at the second AND gate 638, it is desirable to know if the output of the first AND logic gate 634 is NOT true AND at the same time the last output of the OR gate 640 was also true. Accordingly, for example, the output of the second AND gate 638 cannot become true until the output of the OR gate 640 becomes true at least once, which requires the output of the threshold comparator 624 to become true. Once that happens even briefly, then the output of the OR gate 640 will be held true continuously even if the threshold comparator 624 becomes false because of a past value block in which the OR gate 640 stays true if it was true at last time step, for example. In simplified terms, this indicates there will be a switch in the bias at the switch 644 if a Mach value exceeds a threshold even briefly (e.g., at the threshold comparator 624). Then the bias will be held until the first AND logic gate 634 becomes true, which signals that the aircraft 100 has slowed back down and is not maneuvering anymore. As a result, the Mach measurement can be trusted again, and thus it can be desirable to take the bias back out by the OR gate 640 to false and switching the switch 644 back to zero.

In this example, if the switch 644 is turned on, the switch 644 provides the adjustment of the spoiler 112 orientation to a rate limiter 646. In some such examples, the rate limiter 646 sends a signal to a multiplier 656 in communication with a Mach spoiler bias 648 based on the airspeed and maneuvers of the aircraft 100. Specifically, the multiplier 656 determines when the Mach spoiler bias 648 is substantially accurate and can be implemented to adjust the orientation of the spoiler 112, based on the signal from the rate limiter 646.

In this example, the multiplier 656 communicates a Mach spoiler bias signal to a maximum function 658, denoted as "MAX." In the illustrated example, the maximum function 658 also receives the nominal lower command limit 652 and an airspeed spoiler bias signal from an airspeed spoiler bias function 654. The airspeed spoiler bias function 654 calculates the airspeed spoiler bias signal based on the airspeed 650.

In the illustrated example, the maximum function 658 determines the flap pressure shape bias signal to adjust the spoiler 112 orientation based on the Mach spoiler bias signal from the multiplier 656, the airspeed spoiler biasing signal from the airspeed spoiler bias function 654, and/or the nominal lower command limit 652. The maximum function 658 provides the flap pressure shape bias signal to the command mixer 660.

In this example, the command mixer 660 determines a final surface command 662 to adjust the orientation of the spoiler 112 based on the flap pressure shape bias signal, the upper command limit 602, the asymmetric surface command 604, and the symmetric surface command 606. In some examples, the final surface command 662 is communicated to the spoiler actuator 202 to adjust the orientation of the spoiler 112.

The examples of FIGS. 4-6 include example control algorithm implementations. However, any appropriate control algorithm implementation(s) and/or methodology can be implemented instead. Further, elements and/or steps shown in these examples can be omitted, re-arranged and/or re-ordered dependent on application and/or desired flight operation.

While an example manner of implementing the flap pressure shape biasing control system 300 of FIG. 3 is illustrated in FIG. 3, one or more of the elements, processes and/or devices illustrated in FIG. 3 may be combined, divided, re-arranged, omitted, eliminated and/or implemented in any other way. Further, the example flight monitor 304, the example load calculator 308, the example pressure correlator 310, the example spoiler processor 314, the example biasing signal generator 316, and/or, more generally, the example flap pressure shape biasing control system 300 of FIG. 3 may be implemented by hardware, software, firmware and/or any combination of hardware, software and/or firmware. Thus, for example, any of the example the example flight monitor 304, the example load calculator 308, the example pressure correlator 310, the example spoiler processor 314, the example biasing signal generator 316, and/or, more generally, the example flap pressure shape biasing control system 300 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example the example flight monitor 304, the example load calculator 308, the example pressure correlator 310, the example spoiler processor 314, and/or the example biasing signal generator 316 is/are hereby expressly defined to include a non-transitory computer readable storage device or storage disk such as a memory, storage media, etc. including the software and/or firmware. Further still, the example flap pressure shape biasing control system 300 of FIG. 3 may include one or more elements, processes and/or devices in addition to, or instead of, those illustrated in FIG. 3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 7:
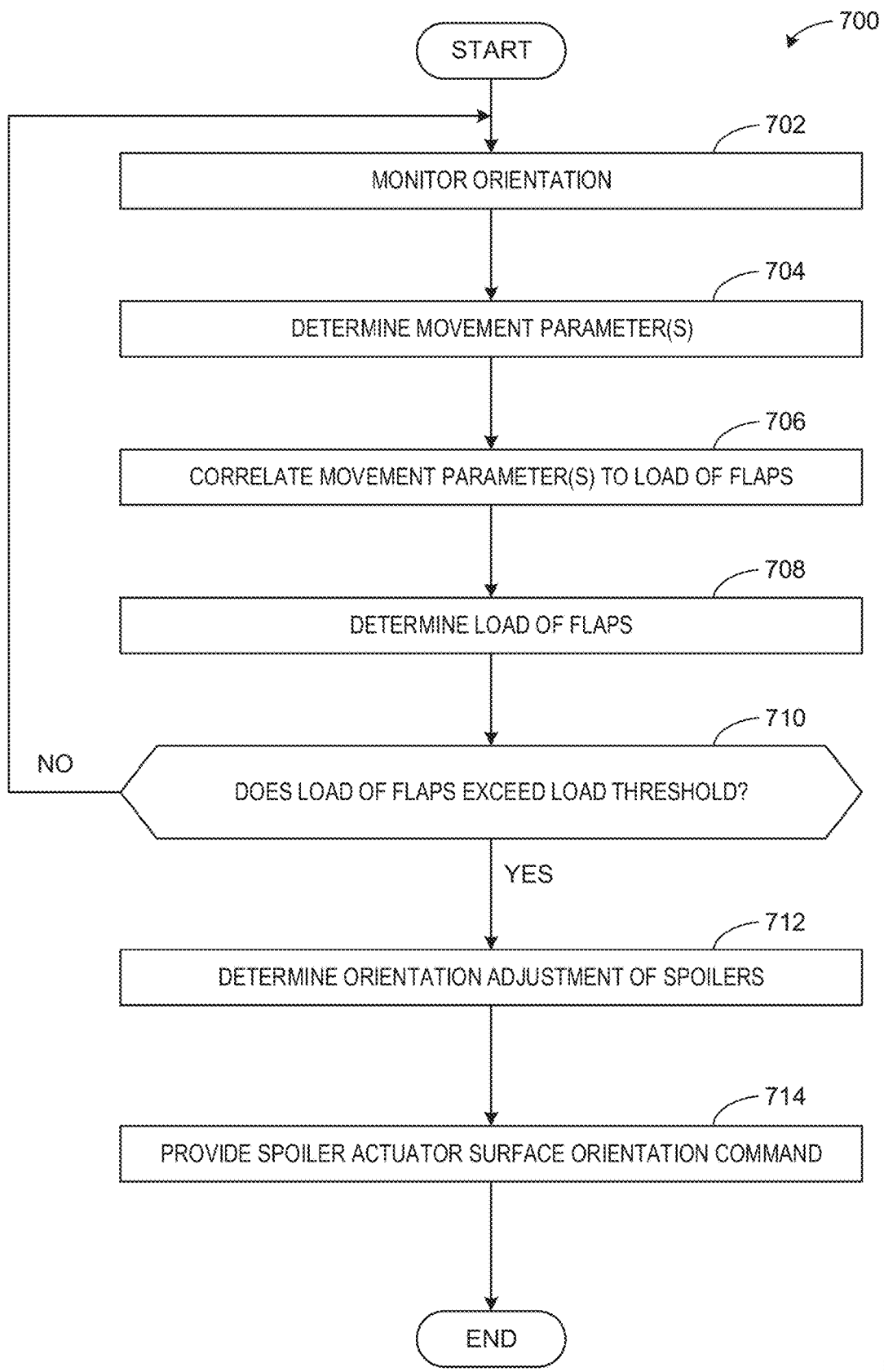
FIG. 7 is a flowchart representative of machine readable instructions which may be executed to implement flap pressure shape biasing.

A flowchart representative of example hardware logic, machine readable instructions, hardware implemented state machines, and/or any combination thereof for implementing the flap pressure shape biasing control system 300 of FIG. 3 is shown in FIG. 7. The machine readable instructions may be one or more executable programs or portion(s) of an executable program for execution by a computer processor such as the processor 812 shown in the example processor platform 800 discussed below in connection with FIG. 8. The program may be embodied in software stored on a non-transitory computer readable storage medium such as a CD-ROM, a floppy disk, a hard drive, a DVD, a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowchart illustrated in FIG. 7, many other methods of implementing the example flap pressure shape biasing control system 300 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIG. 7 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

The example method 700 of FIG. 7 begins as the aircraft 100 is in flight and moving at a significant speed (e.g., close to the speed of sound). In this example, the spoiler 112 is being moved (e.g., rotated) to vary a load encountered by the flap 114 during cruise of the aircraft 100. In other words, the spoiler 112 is being moved to pressure shape bias the aircraft 100.

At block 702, the example flight monitor 304 monitors orientations of the spoiler 112 and/or other control surfaces 108 based on measurements from the sensor(s) 306. For example, the sensor(s) 306 measures a deployment status (e.g., undeployed vs. deployed) and/or a degree of deployment of the control surfaces 108. In some examples, the sensor(s) 306 include inertial measurement unit sensors to measure an orientation of the aircraft 100. Additionally or alternatively, the sensor(s) 306 measure movement of the spoiler 112 and/or an orientation of the aircraft 100.

At block 704, the example flight monitor 304 determines movement parameter(s) of the aircraft 100. For example, the flight monitor 304 determines the airspeed and/or the vertical acceleration of the aircraft 100 (e.g., via the sensor(s) 306). Additionally or alternatively, the flight monitor 304 determines an orientation of the aircraft 100 based on the determined airspeed, data from the sensor(s) 306 and/or measured vertical acceleration. Additionally or alternatively, the flight monitor 304 determines the Mach number of the aircraft 100. In turn, the flight monitor 304 may utilize the measured altitude of the aircraft 100 and the temperature of air to determine the speed of sound at a proximate location of the aircraft 100. The flight monitor 304 can determine and/or calculate the Mach number of the aircraft 100 based on the determined airspeed and the determined speed of sound.

At block 706, in some examples, the pressure correlator 310 of the spoiler controller 302 queries the flap pressure database 312 to correlate the movement parameter, the determined Mach number, the determined vertical acceleration, and/or the determined airspeed, to a load of the flap 114. In some examples, the flap pressure database 312 includes load data developed and/or generated based on test data and/or computational fluid dynamics. In some examples, the test data can be based on wind tunnel testing, and/or flight testing, etc. Specifically, the load data is correlated to specific movement parameter values (e.g., Mach number, airspeed, vertical acceleration, dynamic pressure path, etc.) and, in some examples, orientations of control surfaces 108. In some examples, the pressure correlator 310 queries the flap pressure database 312 to correlate the movement parameters of the aircraft 100 to the load of the flap 114 based on the load data.

At block 708, in some examples, the pressure correlator 310 determines the load of the flap 114. For example, the pressure correlator 310 compares the load of the flap 114 at the determined Mach number, the load of the flap 114 at the determined airspeed, and/or the load of the flap 114 at the determined vertical acceleration to determine the maximum load of the flap 114. Particularly, the maximum load can be selected from the aforementioned comparison(s). In some examples, the load calculator 308 determines the load of the flap 114 based on the determined movement parameters and/or the orientations of the control surfaces 108 of the aircraft 100. In turn, the pressure correlator 310, or the load calculator 308, communicates the maximum load of the flap 114 to the spoiler processor 314.

At block 710, in some examples, the spoiler processor 314 of the spoiler controller 302 determines if the maximum load of the flap 114 determined by the pressure correlator 310 exceeds the load threshold. For example, the spoiler processor 314 compares the maximum load of the flap 114 to the load threshold that correlates to the orientation adjustment of the spoiler 112. Additionally or alternatively, in some examples, different load thresholds correlate to different orientation adjustments of the spoiler 112. If the maximum load of the flap 114 is greater than or equal to the load threshold (block 710), the process proceeds to block 712. Otherwise, the process returns to block 702.

At block 712, the spoiler processor 314 determines the orientation adjustment of the spoiler 112. For example, when the load of the flap 114 exceeds the load threshold, the spoiler processor 314 determines that the spoiler 112 is to rotate approximately 10 degrees from horizontal. In some examples, the orientation adjustment of the spoiler 112 is calculated based on the exceeded load threshold. For example, if the load of the flap 114 exceeds a first load threshold (e.g., a load of 0.8), a first orientation adjustment of the spoiler 112 (e.g., 7 degrees of rotation) is implemented and if the load of the flap 114 exceeds a second load threshold (e.g., a load of 1.1), a second orientation adjustment of the spoiler 112 (e.g., 12 degrees rotation) is implemented. Additionally or alternatively, the spoiler processor 314 can implement any of the example control algorithms 400, 500, 600 described above in connection with FIGS. 4-6.

At block 714, the biasing signal generator 316 of the spoiler controller 302 provides and/or sends a final surface command to the spoiler actuator 202. For example, the biasing signal generator 316 sends a signal to the spoiler actuator 202 with a parameter of the signal corresponding to the determined orientation adjustment of the spoiler 112. Accordingly, the spoiler actuator 202 rotates the spoiler 112 based on the final surface command received from the biasing signal generator 316.

Figure 8:
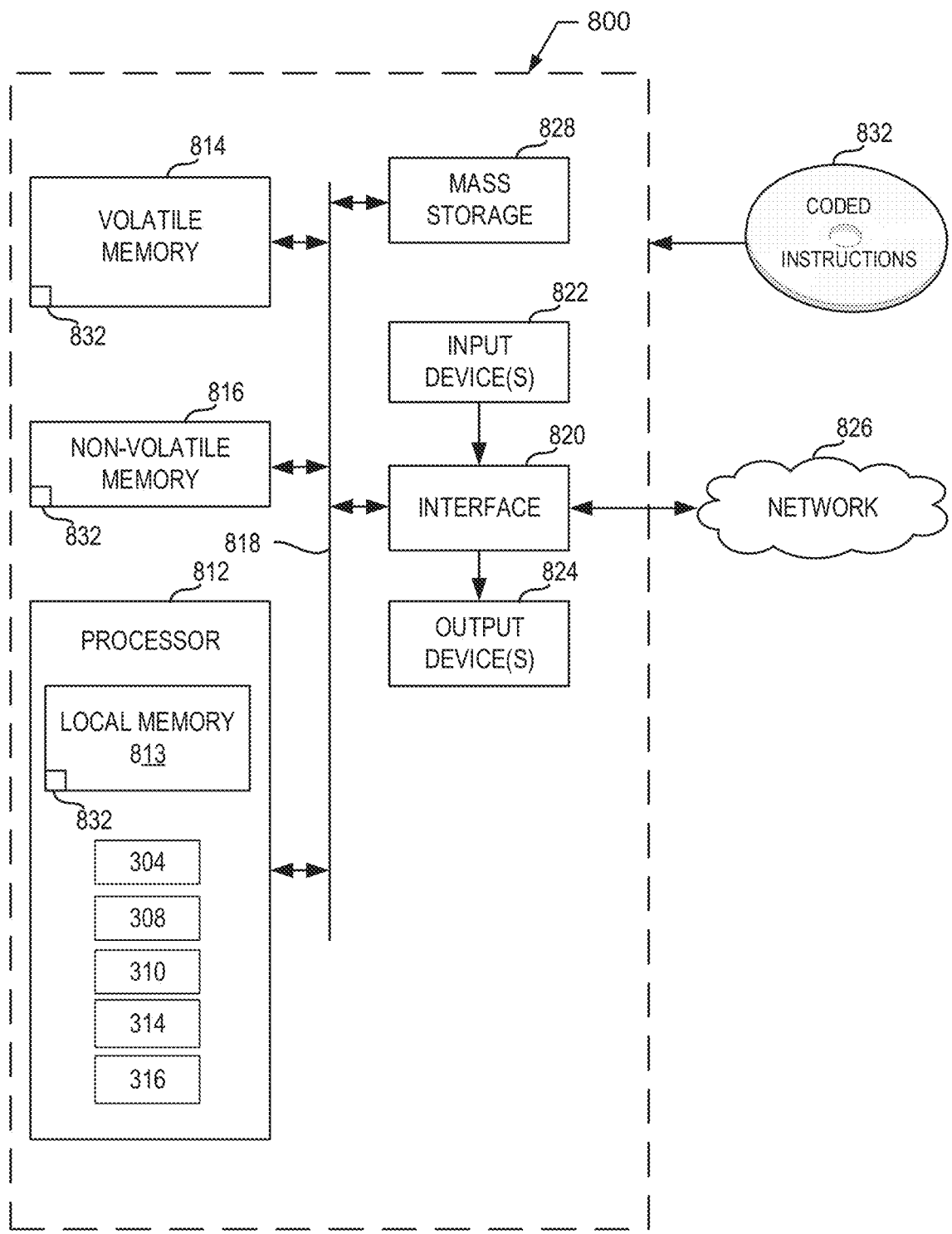
FIG. 8 is a block diagram of an example processing platform structured to execute the instructions of FIG. 7 to implement the flap pressure shape biasing system of FIG. 3.

FIG. 8 is a block diagram of an example processor platform 800 structured to execute the instructions of FIG. 7 to implement the flap pressure shape biasing control system 300 of FIG. 3. The processor platform 800 can be, for example, a server, a personal computer, a workstation, a self-learning machine (e.g., a neural network machine or device), a mobile device (e.g., a cell phone, a smart phone, a tablet such as an iPad), a personal digital assistant (PDA), an Internet appliance, or any other type of computing device.

The processor platform 800 of the illustrated example includes a processor 812. The processor 812 of the illustrated example is hardware. For example, the processor 812 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the flight monitor 304, the load calculator 308, the pressure correlator 310, example spoiler processor 314, and the biasing signal generator 316.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), a Bluetooth® interface, a near field communication (NFC) interface, and/or a PCI express interface.

In the illustrated example, one or more input devices 822 are connected to the interface circuit 820. The input device(s) 822 permit(s) a user to enter data and/or commands into the processor 812. The input device(s) can be implemented by, for example, a velocity sensor, a position sensor, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by a signal generator, display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 820 of the illustrated example, thus, typically includes a graphics driver card, a graphics driver chip and/or a graphics driver processor.

The interface circuit 820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 826. The communication can be via, for example, an Ethernet connection, a digital subscriber line (DSL) connection, a telephone line connection, a coaxial cable system, a satellite system, a line-of-site wireless system, a cellular telephone system, etc.

The processor platform 800 of the illustrated example also includes one or more mass storage devices 828 for storing software and/or data. Examples of such mass storage devices 828 include floppy disk drives, hard drive disks, compact disk drives, Blu-ray disk drives, redundant array of independent disks (RAID) systems, and digital versatile disk (DVD) drives.

The machine executable instructions 832 of FIG. 7 may be stored in the mass storage device 828, in the volatile memory 814, in the non-volatile memory 816, and/or on a removable non-transitory computer readable storage medium such as a CD or DVD.

From the foregoing, it will be appreciated that example methods, apparatus and articles of manufacture have been disclosed that reduce loads on control surfaces (e.g., flaps) of an aircraft by deflecting spoilers or other control surfaces to reduce (e.g., minimize) pressure on flaps at movement parameters that cause a substantial pressure on the flaps.

Example methods, apparatus, systems, and articles of manufacture to pressure shape bias control surfaces of an aircraft are disclosed herein. Further examples and combinations thereof include the following:

Example 1 includes an apparatus for pressure shape biasing of an aircraft, the apparatus comprising a flight monitor to determine a movement parameter of the aircraft, the movement parameter corresponding to at least one of a Mach number of the aircraft, an airspeed of the aircraft, or a vertical acceleration of the aircraft, and a spoiler controller to adjust a position of a spoiler of the aircraft to reduce pressure on a flap based on the movement parameter by moving a pressure transition away from the flap.

Example 2 includes the apparatus of example 1, further including at least one sensor to determine positions of control surfaces of the aircraft.

Example 3 includes the apparatus of example 2, further including a load calculator to calculate loads on the flap based on the movement parameter and the determined positions of control surfaces.

Example 4 includes the apparatus of any of examples 1 or 2, wherein the at least one sensor measures an orientation of the spoiler of the aircraft.

Example 5 includes the apparatus of any of examples 1 to 4, wherein the position of the spoiler is adjusted based on a flap pressure database, the flap pressure database including flap load data that relates loads of the flap to the determined positions of control surfaces of the aircraft and the movement parameter of the aircraft.

Example 6 includes the apparatus of example 5, wherein the flap load data is generated based on at least one of test data or computational data.

Example 7 includes the apparatus of any of examples 1 to 6, wherein the spoiler controller determines a maximum load of the flap by comparing a first load of the flap at the Mach number to a second load of the flap at the airspeed, the maximum load of the flap to be a greater value of the first load and the second load.

Example 8 includes the apparatus of example 7, wherein the spoiler controller compares the maximum load of the flap to a load threshold to determine an adjustment of the position of the spoiler.

Example 9 includes a method to bias a pressure shape corresponding to an aircraft, the method comprising determining, by executing instructions with at least one processor, a movement parameter, the movement parameter corresponding to at least one of a Mach number of the aircraft, an airspeed of the aircraft, or a vertical acceleration of the aircraft, and determining, by executing instructions with the at least one processor, an adjustment of a position of a spoiler of the aircraft based on the movement parameter to move a pressure transition away from a flap.

Example 10 includes the method of example 9, further including correlating, by executing instructions with the at least one processor, the movement parameter to a load of the flap.

Example 11 includes the method of any of examples 9 or 10, further including querying, by executing instructions with the at least one processor, a flap pressure database to determine a maximum load of the flap, the adjustment of the position of the spoiler to be based on the maximum load of the flap.

Example 12 includes the method of example 11, wherein the flap pressure database includes flap pressure data related to different orientations of control surfaces of the aircraft.

Example 13 includes the method of any of examples 11 or 12, further including comparing a first load based on the Mach number to a second load based on the airspeed to determine the maximum load of the flap, the maximum load of the flap to be a greater value of the first load and the second load.

Example 14 includes the method of any of examples 11 to 13, wherein the flap pressure database is generated based on test data or computational data.

Example 15 includes the method of any of examples 11 to 14, further including, by executing instructions with the at least one processor, comparing the maximum load of the flap to a load threshold to determine the adjustment of the position of the spoiler.

Example 16 includes a non-transitory computer readable medium including computer executable instructions that, when executed, cause a processor to at least determine a movement parameter, the movement parameter corresponding to at least one of a Mach number of an aircraft, an airspeed of the aircraft, or a vertical acceleration of the aircraft, and determine, based on the movement parameter, an adjustment of a position of a spoiler of the aircraft to move a pressure transition away from a flap.

Example 17 includes the non-transitory computer readable medium of example 16, wherein the instructions cause the processor to correlate at least one of the Mach number of the aircraft, the airspeed of the aircraft, or the vertical acceleration of the aircraft to a load of the flap to determine the adjustment of the position of the spoiler.

Example 18 includes the non-transitory computer readable medium of any of examples 16 or 17, wherein the instructions cause the processor to query a flap pressure database to determine a maximum load of the flap, the adjustment of the position of the spoiler to be based on the maximum load of the flap.

Example 19 includes the non-transitory computer readable medium of example 18, wherein the flap pressure database includes flap pressure data corresponding to different orientations of control surfaces of the aircraft.

Example 20 includes the non-transitory computer readable medium of any of examples 18 or 19, wherein the flap pressure database is generated based on test data or computational data.

Example 21 includes the non-transitory computer readable medium of example 18, further including instructions which, when executed, cause the processor to compare a first load based on the Mach number to a second load based on the airspeed to determine the maximum load of the flap, the maximum load of the flap to be a greater value of the first load and the second load.

Example 22 includes the non-transitory computer readable medium of example 21, further including instructions which, when executed, cause the processor to compare the maximum load of the flap to a load threshold to determine the adjustment of the position of the spoiler.

The following claims are hereby incorporated into this Detailed Description by this reference, with each claim standing on its own as a separate embodiment of the present disclosure.

What is claimed is:

1. An apparatus for pressure shape biasing of an aircraft, the apparatus comprising:
    a flight monitor to determine a movement parameter of the aircraft, the movement parameter corresponding to at least one of a Mach number of the aircraft, an airspeed of the aircraft, or a vertical acceleration of the aircraft;
    a load calculator to calculate a load of a flap based on the movement parameter;
    a pressure correlator to compare the calculated load to a load threshold; and
    a spoiler controller to adjust, based on the comparison, a position of a spoiler of the aircraft to reduce pressure on the flap by displacing a pressure transition away from the flap.

2. The apparatus of claim 1, further including at least one sensor to determine positions of control surfaces of the aircraft.

3. The apparatus of claim 2, wherein the at least one sensor measures an orientation of the spoiler of the aircraft.

4. The apparatus of claim 1, wherein the position of the spoiler is adjusted based on a flap pressure database, the flap pressure database including flap load data that relates the load of the flap to determined positions of control surfaces of the aircraft and the movement parameter of the aircraft.

5. The apparatus of claim 4, wherein the flap load data is generated based on at least one of test data or computational data.

6. The apparatus of claim 1, wherein the spoiler controller is to determine a maximum load of the flap by comparing a first load of the flap at the Mach number to a second load of the flap at the airspeed, the maximum load of the flap to be a greater value of the first load and the second load.

7. The apparatus of claim 6, wherein the spoiler controller is to compare the maximum load of the flap to the load threshold to determine an adjustment of the position of the spoiler.

8. The apparatus of claim 1, wherein the spoiler controller is to determine a degree of rotational adjustment of the spoiler based on the calculated load.

9. The apparatus of claim 8, wherein the spoiler controller is to adjust the position of the spoiler based on the degree of rotational adjustment.

10. The apparatus of claim 1, wherein the load threshold is associated with a corresponding angular rotation of the spoiler.

11. A method to bias a pressure shape corresponding to an aircraft, the method comprising:
    determining, by executing instructions with at least one processor, a movement parameter, the movement parameter corresponding to at least one of a Mach number of the aircraft, an airspeed of the aircraft, or a vertical acceleration of the aircraft;
    calculating, by executing instructions with the at least one processor, a load of a flap based on the movement parameter,
    comparing, by executing instructions with the at least one processor, the calculated load to a load threshold; and
    determining, by executing instructions with the at least one processor, an adjustment of a position of a spoiler of the aircraft based on the comparison to move a pressure transition away from the flap.

12. The method of claim 11, further including correlating, by executing instructions with the at least one processor, the movement parameter to the load of the flap.

13. The method of claim 12, further including querying, by executing instructions with the at least one processor, a flap pressure database to determine a maximum load of the flap, the adjustment of the position of the spoiler to be based on the maximum load of the flap.

14. The method of claim 13, wherein the flap pressure database includes flap pressure data related to different orientations of control surfaces of the aircraft.

15. The method of claim 13, further including comparing a first load based on the Mach number to a second load based on the airspeed to determine the maximum load of the flap, the maximum load of the flap to be a greater value of the first load and the second load.

16. The method of claim 13, wherein the flap pressure database is generated based on test data or computational data.

17. The method of claim 13, further including, by executing instructions with the at least one processor, comparing the maximum load of the flap to a load threshold to determine the adjustment of the position of the spoiler.

18. A non-transitory computer readable medium including computer executable instructions that, when executed, cause a processor to at least:
   determine a movement parameter, the movement parameter corresponding to at least one of a Mach number of an aircraft, an airspeed of the aircraft, or a vertical acceleration of the aircraft;
   calculate a load of a flap based on the movement parameter,
   compare the calculated load to a load threshold; and
   determine, based on the comparison, an adjustment of a position of a spoiler of the aircraft to move a pressure transition away from the flap.

19. The non-transitory computer readable medium of claim 18, wherein the instructions cause the processor to correlate at least one of the Mach number of the aircraft, the airspeed of the aircraft, or the vertical acceleration of the aircraft to the load of a flap to determine the adjustment of the position of the spoiler.

20. The non-transitory computer readable medium of claim 18, wherein the instructions cause the processor to query a flap pressure database to determine a maximum load of the flap, the adjustment of the position of the spoiler to be based on the maximum load of the flap.

21. The non-transitory computer readable medium of claim 20, wherein the flap pressure database is generated based on test data or computational data.

22. The non-transitory computer readable medium of claim 20, wherein the flap pressure database includes flap pressure data corresponding to different orientations of control surfaces of the aircraft.

* * * * *